United States Patent
Shono et al.

(10) Patent No.: US 7,360,046 B2
(45) Date of Patent: *Apr. 15, 2008

(54) STORAGE SYSTEM AND DATA MANAGEMENT METHOD

(75) Inventors: Kazuaki Shono, Odawara (JP); Yusuke Hirakawa, Odawara (JP); Katsuhiro Okumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 354 days.

This patent is subject to a terminal disclaimer.

(21) Appl. No.: 11/158,363

(22) Filed: Jun. 20, 2005

(65) Prior Publication Data
US 2006/0242371 A1 Oct. 26, 2006

(30) Foreign Application Priority Data
Apr. 21, 2005 (JP) .............................. 2005-123665

(51) Int. Cl.
*G06F 12/00* (2006.01)
(52) U.S. Cl. ...................... 711/162; 711/114; 711/154; 707/204; 714/6; 714/15
(58) Field of Classification Search ................ 711/162, 711/114, 154; 707/204; 714/6, 15
See application file for complete search history.

(56) References Cited

U.S. PATENT DOCUMENTS

| 5,592,618 | A  | * | 1/1997  | Micka et al. ................. 714/54 |
| 6,085,298 | A  | * | 7/2000  | Ohran ........................ 711/162 |
| 6,751,715 | B2 | * | 6/2004  | Hubbard et al. ............ 711/162 |
| 6,854,038 | B2 | * | 2/2005  | Micka et al. ............... 711/156 |
| 7,194,590 | B2 | * | 3/2007  | Achiwa et al. ............. 711/162 |
| 2003/0126107 | A1 |   | 7/2003  | Yamagami |
| 2004/0268067 | A1 |   | 12/2004 | Yamagami |

* cited by examiner

*Primary Examiner*—Stephen C. Elmore
(74) *Attorney, Agent, or Firm*—Townsend and Townsend and Crew LLP

(57) ABSTRACT

On the first storage device side, when data is written in a first volume, a journal of such data is transmitted to a second storage device; on the second storage device side, a snapshot of a second volume and the respective journals are stored; on the second storage device side, the first volume is rebuilt at a rebuilding time according to a rebuilding order; on the second storage device side, data of an address rewritten from the rebuilding time onward is transmitted as difference data to the first storage device; and on the first storage device side, the first volume is rebuilt at the rebuilding time based on the difference data.

13 Claims, 12 Drawing Sheets

| SEQUENCE NUMBER | SNAPSHOT CREATION TIME | WRITE DESTINATION ADR |
|---|---|---|
| 0x21 | 05/01/01 10:00 | 0x04 |
| 0x20 | 05/01/01 9:00 | 0x03 |
| ⋮ | ⋮ | ⋮ |

| ADDRESS | DATA |
|---------|------|
| 0x01 | 102 |
| 0x02 | 201 |
| ⋮ | ⋮ |

STORAGE SYSTEM AND DATA MANAGEMENT METHOD

CROSS-REFERENCES TO RELATED APPLICATIONS

This application relates to and claims priority from Japanese Patent Application No. 2005-123665, filed on Apr. 21, 2005, the entire disclosure of which is incorporated herein by reference.

BACKGROUND OF THE INVENTION

1. Field of the Invention

The present invention relates to a storage system and data management method and, for instance, is preferably employed in a storage system.

2. Description of the Related Art

Conventionally, as a management method of stored data in a storage system, the process of backing up data stored in a volume and, when there is any failure in this volume (including the data stored in this volume), using this backup data for rebuilding the volume to the state prior to such failure is being widely used.

As this kind of backup method in a storage system, conventionally, there is a method where, when data is written in a primary volume from a host computer, a so-called journal representing the written content (data itself or an address with data written therein, etc.) is transferred from the primary side to the secondary side, and the same data is written in a secondary volume in the same address according to this journal on the secondary side. According to this method, a volume having the entirely same contents as the primary volume can be created on the secondary side.

Further, as a rebuilding method of a volume in a storage system, a method has been proposed for enabling the rebuilding of the state of the primary volume at an arbitrary point in time by employing such journal and a snapshot function of the storage system (c.f. Japanese Patent Laid-Open Publication No. 2005-18738). Incidentally, a snapshot is a memory image of the primary volume at a certain point in time.

With this method, in addition to sequentially accumulating journals, a snapshot of the primary volume is acquired in prescribed time intervals, and, when rebuilding the content of the volume at a certain time (this is hereinafter referred to as the "rebuilding time"), a snapshot having an acquisition time that is earlier than the rebuilding time and in which the acquisition time thereof is closest to the rebuilding time is sequentially subject to the journals, in the order from old to new, from the time such snapshot was acquired up to the rebuilding time. Further, foregoing Japanese Patent Laid-Open Publication No. 2005-18738 discloses that first and second threshold limits are provided to the cumulative amount of the journals, and, by controlling the cumulative amount of the journals to constantly be within the first and second threshold limits, overload of the memory capacity caused by unnecessary journals can be prevented.

Moreover, as a backup and volume rebuilding processing method, disclosed is a method of providing to the secondary side a volume for storing the same contents as the primary volume via remote copying and a volume for retaining backup data of the primary volume at a certain point in time, and, when rebuilding the primary volume, foremost, the volume retaining the secondary backup data is copied to the other volume on the secondary side, and this volume is thereafter copied to the primary volume (c.f. Japanese Patent Laid-Open Publication No. 2003-233518).

SUMMARY OF THE INVENTION

Meanwhile, with a conventional storage system, as with the method described in Japanese Patent Laid-Open Publication No. 2005-18738, a primary volume for storing data from the host computer and a secondary volume for storing backup data are both provided within the same storage device. Thus, with a conventional storage system, the processing load for performing backup processing in the storage device and the capacity load for storing the backup data were significant, and there were problems in that the backup processing and data I/O request from the host computer would compete and deteriorate the responsiveness to such data I/O request, and the memory capacity for storing data from the host computer would be become overloaded.

Even with the method disclosed in foregoing Japanese Patent Laid-Open Publication No. 2005-18738, the processing load for performing backup processing in the storage device and the capacity load are still major problems, and it cannot be said that this provides a sufficient solution for overcoming these problems.

Further, although Japanese Patent Laid-Open Publication No. 2003-233518 discloses the provision of a secondary volume to a sub storage device in addition to providing a primary volume to a main storage device, if the secondary volume is copied as is, this will cause problems of the transfer load between the sub storage device and the main storage device to receive data from the host computer becoming significant, and the processing load of the main storage device becoming significant, and thereby deteriorate the responsiveness to the host computer.

The present invention was devised in view of the foregoing problems, and an object thereof is to provide a storage system and data management method capable of considerably reducing the processing load and capacity load of the main storage device in relation to the backup processing and volume rebuilding processing.

In order to achieve the foregoing object, the present invention is a storage system having a first storage device connected to a host system and which provides a first volume for storing data transmitted from the host system, and a second storage device connected to the first storage device and which provides a second volume for storing backup data of the first volume; wherein the first storage device includes a journal creation unit for creating a journal representing the written contents when the data is written in the first volume; the second storage device includes: a snapshot acquisition unit for acquiring a snapshot of the second volume in a prescribed timing; a memory device for storing each of the journals transmitted from the first storage device and the snapshot acquired with the snapshot acquisition unit; a volume rebuilding unit for rebuilding, upon using the corresponding the journal and the snapshot stored in the memory device in accordance with the rebuilding order designating the rebuilding time provided from the host system, the first volume at the rebuilding time; and a difference data output unit for outputting the data of an address rewritten from the rebuilding time onward among the rebuilt data stored in the first volume at the rebuilding time as difference data; and the first storage device rebuilds the first volume at the rebuilding time based on the difference data transmitted from the second storage device.

As a result, this storage system is able to effectively prevent the overload of the memory capacity of the first storage device caused by the first storage device retaining backup data, while rebuilding the first volume without imposing burden on the first storage device. Accordingly, the processing load and capacity load of the first storage device, which is the main storage device, can be considerably reduced in relation to the backup processing and volume rebuilding processing.

Further, the present invention is also a data management method in a storage system having a first storage device connected to a host system and which provides a first volume for storing data transmitted from the host system, and a second storage device connected to the first storage device and which provides a second volume for storing backup data of the first volume, including: a first step of creating, on the first storage device side, a journal representing the written contents when the data is written in the first volume and transmitting this to the second storage device, and, on the second storage device side, acquiring a snapshot of the second volume in a prescribed timing and storing the snapshot and each of the journals transmitted from the first storage device; a second step of rebuilding, on the second storage device side, upon using the corresponding the journal and the snapshot stored in the memory device in accordance with the rebuilding order designating the rebuilding time provided from the host system, the first volume at the rebuilding time; a third step of transmitting, on the second storage device side, the data of an address rewritten from the rebuilding time onward among the rebuilt data stored in the first volume at the rebuilding time as difference data to the first storage device; and a fourth step of rebuilding, on the first storage device side, the first volume at the rebuilding time based on the difference data.

As a result, this data management method is able to effectively prevent the overload of the memory capacity of the first storage device caused by the first storage device retaining backup data, while rebuilding the first volume without imposing burden on the first storage device. Accordingly, the processing load and capacity load of the first storage device, which is the main storage device, can be considerably reduced in relation to the backup processing and volume rebuilding processing.

Moreover, the present is also a storage system having a first storage device connected to a host system and including a first volume for storing data transmitted from the host system, and a second storage device connected to the first storage device and including a second volume for storing backup data of the first volume; wherein the first storage device includes a journal representing the written contents when the data is written in the first volume, and a transmission unit for transmitting the journal to the second storage device; the second storage device includes: a snapshot acquisition unit for acquiring a snapshot of the second volume in a prescribed timing; a memory device for storing the journal transmitted from the first storage device and the snapshot acquired with the snapshot acquisition unit; a rebuilding unit for rebuilding, upon using the snapshot stored in the memory device in accordance with the rebuilding order designating the rebuilding time provided from the host system and the journal stored in the memory and associated with the rebuilding order in accordance with the rebuilding order, the data content stored in the first volume at the rebuilding time; and a difference data output unit for transmitting the data corresponding to an address written from the host system after the rebuilding time among the data content as difference data to the first storage device; and the first storage device rebuilds the data content stored in the first volume at the rebuilding time based on the difference data transmitted from the second storage device, and the first volume.

As a result, this storage system is able to effectively prevent the overload of the memory capacity of the first storage device caused by the first storage device retaining backup data, while rebuilding the first volume without imposing burden on the first storage device. Accordingly, the processing load and capacity load of the first storage device, which is the main storage device, can be considerably reduced in relation to the backup processing and volume rebuilding processing.

BRIEF DESCRIPTION OF THE DRAWINGS

FIG. 7(A) is a conceptual diagram for explaining the journal deletion processing;

FIG. 7(B) is a conceptual diagram for explaining the journal deletion processing;

DETAILED DESCRIPTION OF THE PREFERRED EMBODIMENTS

An embodiment of the present invention is now described in detail with reference to the attached drawings.

Figure 1:
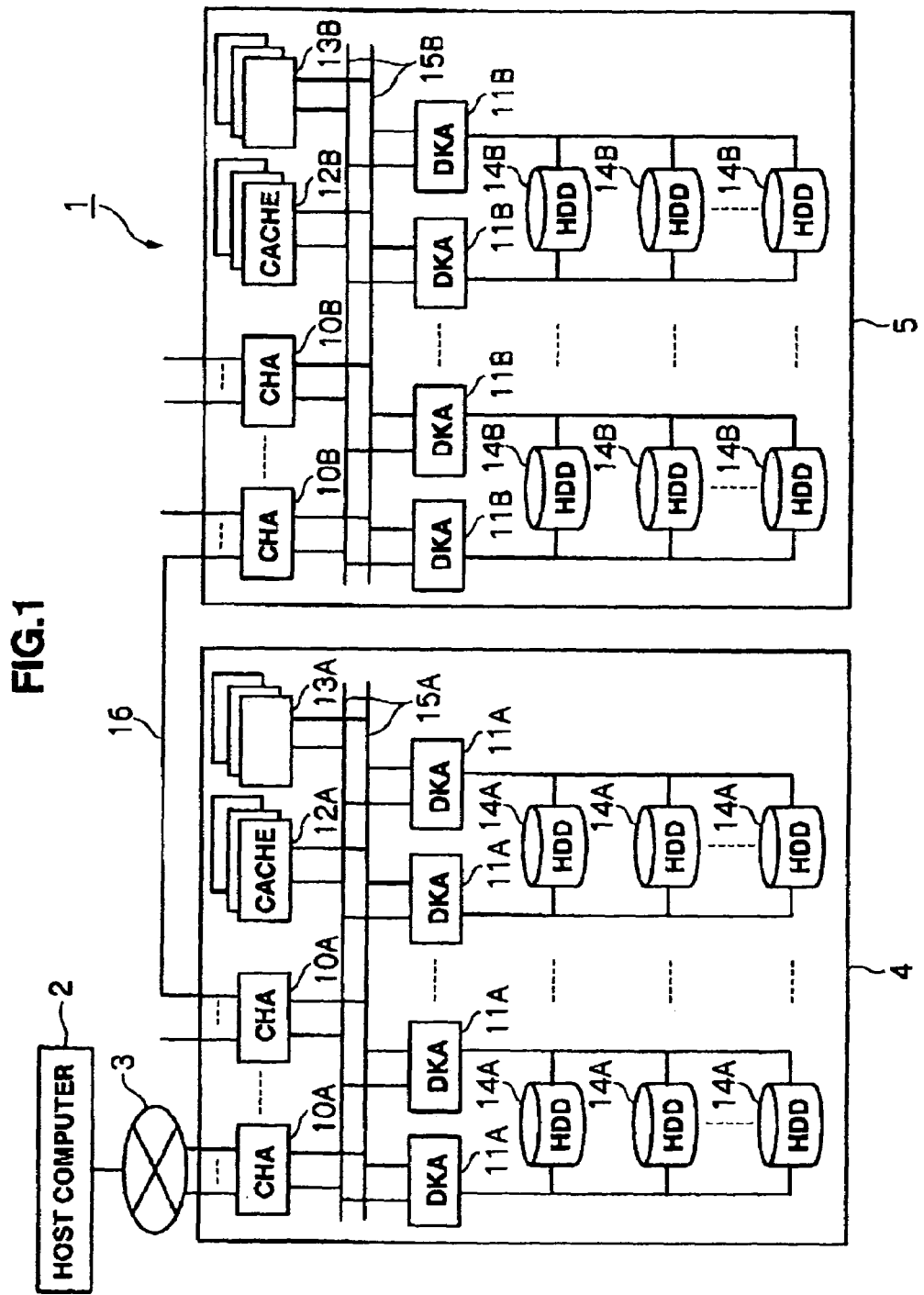
FIG. 1 is a block diagram showing the configuration of the storage system according to the first embodiment.

(1) First Embodiment (1-1) Configuration of Storage System in Present Embodiment FIG. 1 is a diagram showing a storage system 1 of the present embodiment. The storage system 1 is configured by a host computer 2 being connected to a first storage device (this is hereinafter referred to as a "first DKC") 4 via a network 3, and a second storage device (this is hereinafter referred to as a "second DKC") 5 for data backup being connected to this first DKC 4.

The host computer 2 is a computer equipped with the likes of a CPU (Central Processing Unit) and memory. Various functions are realized by the CPU of the host computer 2 executing various programs. The host computer 2, for example, is constituted from the likes of a personal computer, workstation or mainframe computer.

The host computer 2 is able to perform the I/O of data to and from the first DKC 4 via the network 3. The network 3 may be constituted, for instance, from a LAN, SAN, Internet, dedicated line, public line or the like depending on the usage. Communication between the host computer 2 and first DKC 4 via the network 3 is conducted, for example, according to a fiber channel protocol when the network 3 is a SAN, and according to the TCP/IP (Transmission Control Protocol/Internet Protocol) protocol when the network 3 is a LAN.

The first DKC 4 is configured by having a plurality of channel adapters 10A, a plurality of disk adapters 11A, a cache memory 12A, a shared memory 13A and a plurality of memory devices 14A.

The channel adapters 10A function as a transmission/reception unit for transmitting and receiving data or various commands between the external devices (e.g., the host computer 2 and second DKC 5) connected to the first DKC 4, and have a communication port. Each of the channel adapters 10A is configured as a microcomputer system having the likes of a microprocessor (MP) and internal memory, and interprets and executes the various commands that it receives from the external devices. A network address (e.g., IP (Internet Protocol) address or WWN (World Wide Name)) for individual identification is assigned to the respective communication ports of the channel adapters 10A, and, in such a case, the channel adapters 10A are able to respectively act as a NAS (Network Attached Storage). Further, each of the channel adapters 10A is able to perform the various processing steps by executing a control program stored in the internal memory, and, for instance, is able to execute the backup processing and rebuilding processing described later.

The disk adapters 11A are for giving and receiving data to and from the memory devices 14A, and a pair of two is connected to the same memory device 14A for yielding redundancy. Each of the disk adapters 11A is configured as a microcomputer system having the likes of a CPU and memory.

Each of the disk adapters 11A performs processing for writing data in the memory device 14A or reading data from the memory device 14A according to instructions from the channel adapter 10A. When inputting or outputting data to or from the memory device 14A, each of the disk adapters 11A converts a logical address designated by the host computer 2 into a physical address. When the memory devices 14A are being managed according to RAID, each of the disk adapters 11A performs data access according to the RAID configuration.

The cache memory 12A is a memory for temporarily storing data received from the host computer 2 or data read from the memory devices 14A. The shared memory 13A stores control information and the like for controlling the operation of the first DKC 4.

These channel adapters 10A, disk adapters 11A, cache memory 12A and shared memory 13A are mutually connected via a LAN 15A, and are capable of transmitting and receiving necessary commands and data via this LAN 15A.

The memory devices 14A, for instance, are configured from an expensive disk drive such as a SCSI (Small Computer System Interface) disk, or an inexpensive disk device such as a SATA (Serial AT Attachment) disk or optical disk. One or a plurality of logical volumes (this is hereinafter referred to as a logical volume) is set on a physical memory area provided by one or a plurality of disk devices. And data is stored in this logical volume.

The second DKC 5 is configured the same as the first DKC 4 excluding the point that an inexpensive disk device such as a SATA (Serial AT Attachment) disk or optical disk is being used as the memory device 14B. In FIG. 1, the respective constituent elements of the second DKC 5 that are the same as the constituent elements of the first DKC 4 are given the subscript "B" in place of the subscript "A" in the same reference numeral. The second DKC 5 is connected to the first DKC 4 via a signal line 16 such as a cable or LAN, and is capable of transmitting and receiving necessary commands and data to and from the first DKC 4 via this signal line 16.

In the second DKC 5 also, one or a plurality of logical volumes is set on a physical memory area provided by the memory devices 14B within the second DKC 5, and various data such as the backup data of the first DKC 4 is stored in this logical volume as described later.

The flow of I/O of data between the host computer 2 and first DKC 4 in this storage system 1 is now explained. When a command for writing data in the logical volume within the first DKC 4 is input pursuant to the user's operation, the host computer 2 transmits a corresponding data write request and data to be written to a prescribed channel adapter 10A of the first DKC 4.

The channel adapter 10A that received this data write request writes the write command in the shared memory 13A, and writes the data to be written in the cache memory 12A. Meanwhile, the disk adapter 11A is constantly monitoring the shared memory 13A, and, when is detects that a write command has been written in the shared memory 13A, it converts the data write request based on the logical address designation into the data write request based on the physical address designation, further reads the data to be written from the cache memory 12A, and writes this in the corresponding address location of the corresponding memory device 14A.

Meanwhile, when a command for reading the data stored in a prescribed logical volume within the first DKC 4 is input pursuant to the user's operation, the host computer 2 transmits a corresponding data read request to a prescribed channel adapter 10A within the first DKC 4.

The channel adapter 10A that received this data read request writes the read command in the shared memory 12A. Further, when the disk adapter 11A detects that a read command has been written in the shared memory 12A, it converts the data read request based on the logical address designation into the data read request based on the physical address designation, and reads the designated data from the corresponding address location of the corresponding memory device 14A based on this address.

Further, the disk adapter 11A writes the data read from this memory device 14A in the cache memory 12A, and writes the read command in the shared memory 13A. Here, the channel adapter 10A is constantly monitoring the shared memory 13A, and when it detects that a read command has been written in the shared memory 13A, it reads the corresponding data from the cache memory 12A according to this read command, and transmits this to the corresponding host computer 2 via the network 3.

(1-2) Backup Processing and Volume Rebuilding Processing

Next, the data management method relating to the backup processing and volume rebuilding processing in the storage system 1 is explained with reference to FIG. 2 to FIG. 4. The storage system 1 according to the present embodiment performs volume rebuilding processing within the second DKC 5 for rebuilding the contents of the logical volume in the first DKC 4 at a certain time, provides only the difference with the contents of the current logical volume from the second DKC 5 to the first DKC 4, and, based thereon, rebuilds the logical volume of the first DKC 4 to the state of the designated time.

Figure 2:
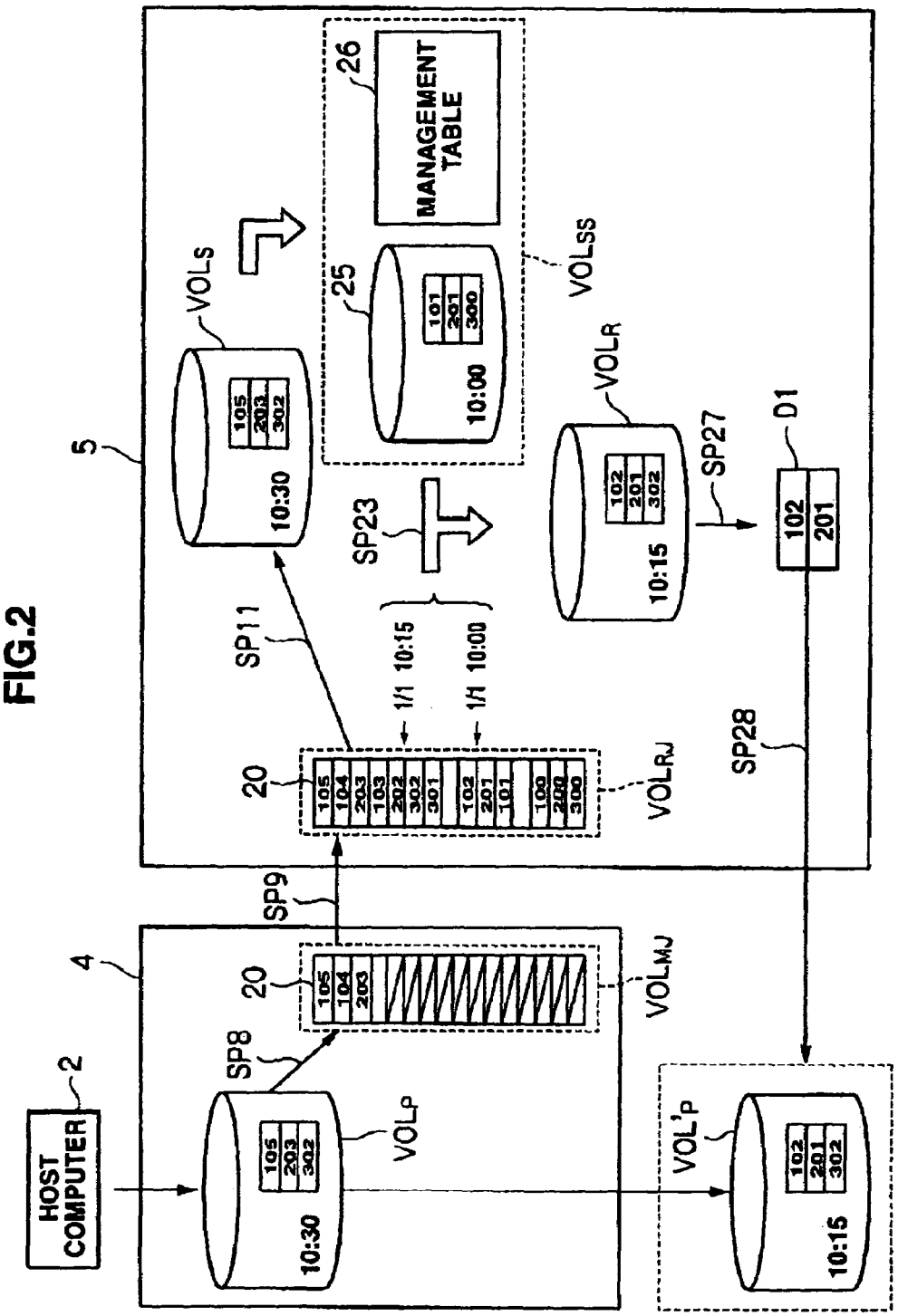
FIG. 2 is a conceptual diagram schematically showing the contents of the backup processing and volume rebuilding processing according to the first embodiment.

FIG. 2 is a conceptual diagram schematically showing the contents of the backup processing and volume rebuilding processing. Further, FIG. 3 and FIG. 4 are flowcharts showing the specific processing steps of the first and second DKC 4, 5 relating to the backup processing and volume rebuilding processing in this storage system 1. Incidentally, in the following explanation, the logical volume for inputting and outputting data within the first DKC 4 is referred to as the primary logical volume $VOL_P$ (FIG. 2), and the logical volume provided within the second DKC 5 for backup is referred to as the secondary logical volume $VOL_S$ (FIG. 2).

The channel adapter (this is hereinafter referred to as the primary channel adapter) 10A of the first DKC 4, initially, waits in a standby mode for some type of I/O from the host computer 2 (this is hereinafter referred to as the host I/O) according to the backup/volume rebuilding processing routine RT1 shown in FIG. 3 (SP1). In addition to a data I/O request, a command for giving an order used in the present invention referred to as the rebuilding processing, which is a rebuilding order of the primary logical volume at a desired time, is also included in the host I/O.

Eventually, when the primary channel adapter 10A receives a host I/O from the host computer 2 (SP1; YES), it checks whether at present the first DKC 4 is set to a writable mode allowing the writing in the corresponding primary logical volume $VOL_P$ (SP2). The first DKC 4 is usually set to the writable mode, but is set to a write protect mode for prohibiting the writing in the primary logical volume $VOL_P$ upon volume rebuilding processing as described later.

And, when the mode in relation to the primary logical volume $VOL_P$ is set to the write protect mode (SP2; NO), the primary channel adapter 10A executes prescribed error processing such as by notifying the host computer 2 to such effect (SP3). Contrarily, when the mode in relation to the primary logical volume $VOL_P$ is set to the writable mode (SP2; YES), the primary channel adapter 10A checks whether such host I/O is a rebuilding processing (SP4).

When the host I/O is not a rebuilding processing (SP4; NO), the primary channel adapter 10A checks whether the host I/O is a data write request (SP5). And, when the host I/O is not a data write request, and, for instance, is a command such as a data read request (SP5; NO), the primary channel adapter 10A executes prescribed processing corresponding to such host I/O (SP6), and returns to the standby mode once again and waits for a host I/O from the host computer 2 (SP1).

Meanwhile, when the host I/O is a data write request (SP5; YES), the primary channel adapter 10A executes standard write processing according to this host I/O (data write request command) (SP7). Specifically, the primary channel adapter 10A writes the data write request command based on this host I/O in the shared memory 13A, and also writes data to be written, which is to be transmitted from the host computer 2 together with the host I/O, in the cache memory 12A. As a result, this data will be written in the corresponding address location within the corresponding memory devices 14A based on the disk adapter 11A as described above.

Figure 5:
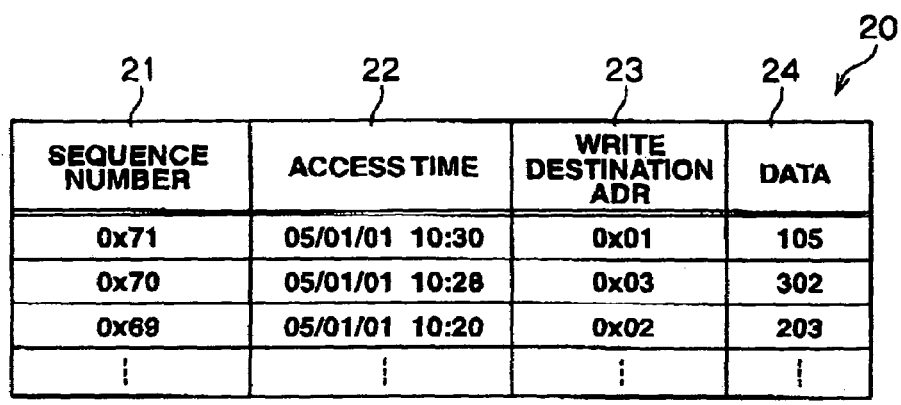
FIG. 5 is a conceptual diagram for explaining a journal.

Further, the primary channel adapter 10A thereafter creates a journal 20 (FIG. 5) for one entry worth in relation to the writing of data (SP8). In the case of the present embodiment, the journal 20, as shown in FIG. 5, is constituted from a sequence number field 21, an access time field 22, a destination address field 23 and a data field 24. And, a sequence number is stored in the sequence number field 21 of the journal, the date and time in which such data was written are stored in the access time field 22, the logical address of the data destination is stored in the destination address field 23, and the data actually written in the primary logical volume $VOL_P$ is stored in the data field 24.

The primary channel adapter 10A, in addition to storing the journal data composed from the data of this journal 20 in a logical volume (this is hereinafter referred to as the primary journal logical volume) $VOL_{MJ}$ (FIG. 2) for the journal provided within the first DKC 4 in advance, transmits the journal data for one entry worth to the second DKC 5 (SP9). Incidentally, the primary journal logical volume $VOL_{MJ}$ may be provided, for instance, to the memory device 14A within the first DKC 4.

In the second DKC 5, the journal data transmitted from the first DKC 4 is received with the corresponding channel adapter (this is hereinafter referred to as the secondary channel adapter) 10B. And, this secondary channel adapter 10B stores the received journal data in a logical volume (this is hereinafter referred to as the secondary journal logical volume) $VOL_{RJ}$ (FIG. 2) provided within the second DKC 5 in advance for storing journals (SP10). Incidentally, the secondary journal logical volume $VOL_{RJ}$, for instance, may be provided to the memory device 14B within the second DKC 5.

Further, the secondary channel adapter 10B writes the data stored in the data field 24 (FIG. 5) of the journal 20 based on this journal data in the address location stored in the destination address field 23 (FIG. 5) of such journal 20 in the secondary logical volume $VOL_S$ (SP11). Specifically, the secondary channel adapter 10B performs processing similar to the data write processing explained in step SP7 above. Thereby, data identical to the data written in the primary logical volume $VOL_P$; that is, the backup data of the primary logical volume $VOL_P$ will be stored in the secondary logical volume $VOL_S$. And, this secondary channel adapter 10B thereafter transmits to the first DKC 4 a notification to the effect that the writing of such data is complete.

The primary channel adapter 10A of the first DKC 4 that received this notification will delete the entry of the journal 20 regarding the data created at foregoing step SP8 from the primary journal logical volume $VOL_{MJ}$ (SP12).

Further, the secondary channel adapter 10B that transmitted this notification checks whether the data volume of the journal 20 stored in the secondary journal logical volume $VOL_{RJ}$ (this is hereinafter referred to as the journal data volume) exceeded the first threshold limit set in advance (SP13).

When the journal data volume stored in the secondary journal logical volume $VOL_{RJ}$ is not exceeding the first threshold limit (SP13; NO), the secondary channel adapter 10B returns to the standby mode once again and waits for a host I/O from the host computer 2 (SP1). Contrarily, when the journal data volume is exceeding the first threshold limit (SP13; YES), the secondary channel adapter 10B executes prescribed journal deletion processing for reducing the journal data volume (SP14).

Figure 6:
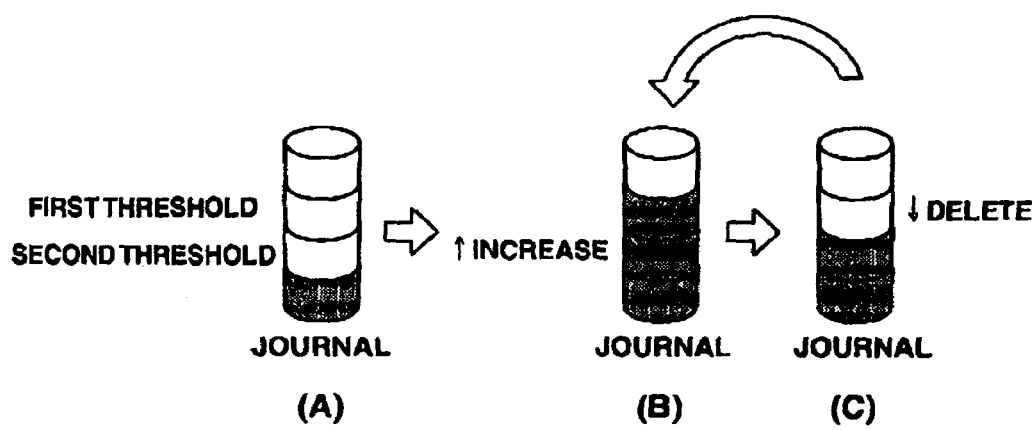
FIG. 6 is a conceptual diagram for explaining the journal deletion processing.

Specifically, as shown in FIG. 6(A), a first threshold limit as the threshold limit of the journal data volume, and a lesser second threshold volume are provided to the secondary channel adapter 10B in advance. And, when the journal data volume reaches the first threshold limit as shown in FIG. 6(B), the secondary channel adapter 10B deletes the entries of the journal 20 in order from the oldest entry until the journal data volume reaches the second threshold limit as shown in FIG. 6(C).

Further, as shown in FIG. 7(A), by the secondary channel adapter 10B sequentially applying in order from the oldest entry the journal 20 to be deleted against the oldest snapshot 25A among the several snapshots 25 (FIG. 2) stored in the snapshot logical volume $VOL_{SS}$ (FIG. 2) described later, as shown in FIG. 7(B), it newly acquires the oldest snapshot 25C. Like this, the secondary channel adapter 10B deletes the entries of an unnecessary journal 20 while securing a given quantity of entries of the journal 20 for rebuilding.

Then, when the secondary channel adapter 10B finishes the deletion processing of such journal 20, it returns to the standby mode once again and waits for a host I/O from the host computer 2 (SP1), and repeats the same processing steps thereafter (SP1 to SP14-SP1).

Thereupon, the secondary channel adapter 10B uses the secondary logical volume $VOL_S$ storing the same data as the primary logical volume $VOL_P$ described above and acquires the snapshot of the secondary logical volume $VOL_S$ for each prescribed time interval (e.g., one or several hours), and sequentially stores such data in the foregoing snapshot logical volume $VOL_{SS}$ constituted from a logical volume for snapshots set in advance.

Figures 7, 8:
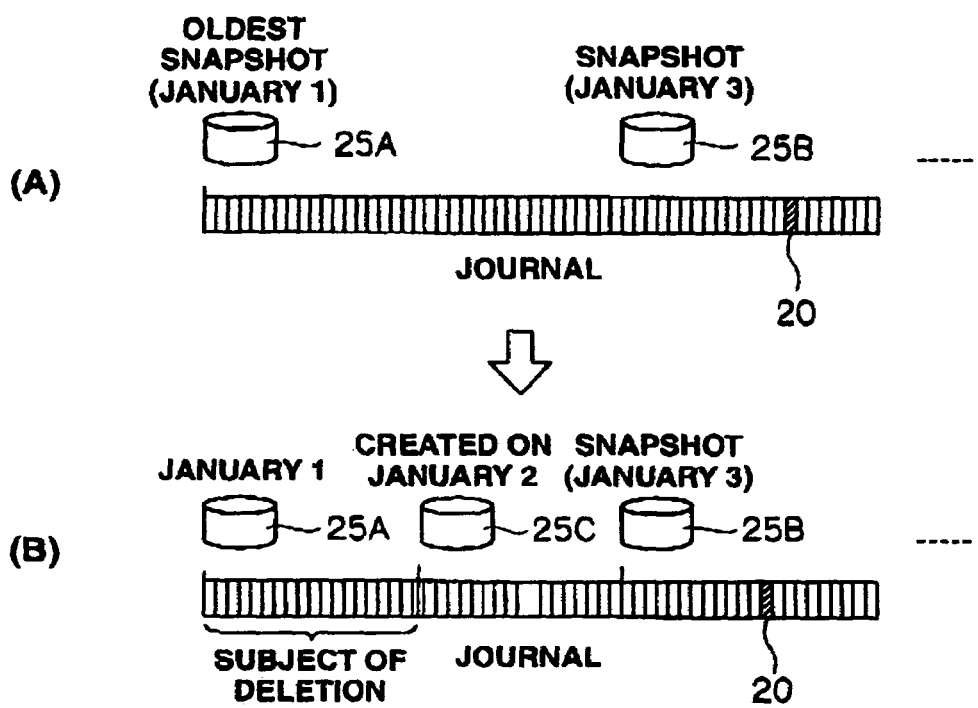
FIG. 8 is a conceptual diagram showing the snapshot management table.

Further, together with this, the secondary channel adapter 10B registers the sequence number of the snapshot 25, date and time the snapshot 25 was acquired, and the address storing the data of the snapshot 25 in the snapshot logical volume $VOL_{SS}$ as shown in FIG. 8 in a snapshot management table 26 (FIG. 8) created for managing snapshots, and stores this snapshot management table 26 in the snapshot logical volume $VOL_{SS}$.

Meanwhile, when a rebuilding processing is eventually provided from the host computer 2 (SP5; YES), the primary channel adapter 10A and secondary channel adapter 10B execute volume rebuilding processing for rebuilding the primary logical volume $VOL_P$ of a designated rebuilding time (SP15).

Figure 4:
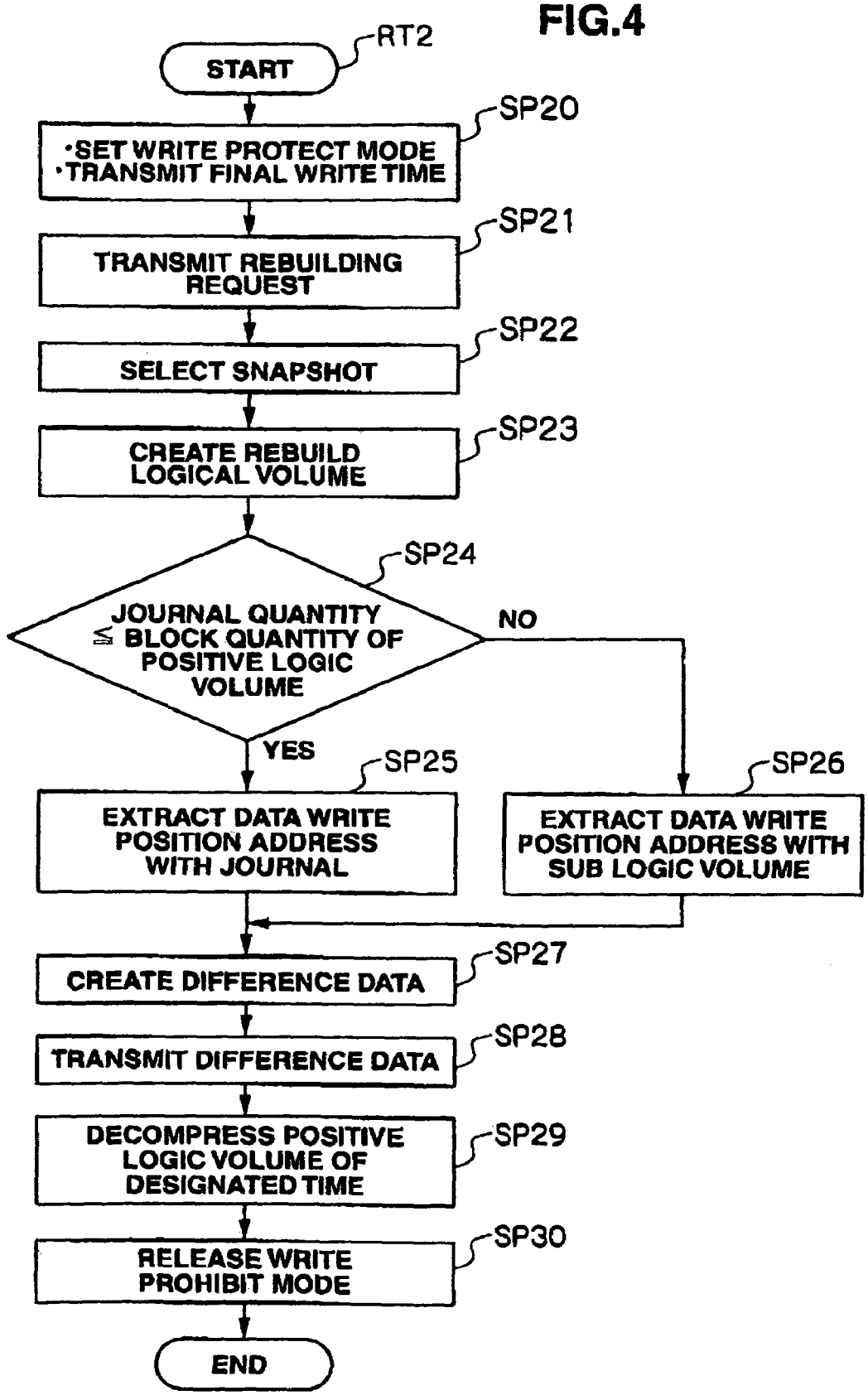
FIG. 4 is a flowchart showing the first volume rebuilding processing routine.

Specifically, according to the first volume rebuilding processing routine RT2 shown in FIG. 4, the primary channel adapter 10A foremost sets a data write protect mode to itself and other primary channel adapters 10A for preventing the writing of data in the primary logical volume $VOL_P$ to be rebuilt (SP20). Further, this primary channel adapter 10A transmits to the second DKC 5 the rebuilding order of the primary logical volume $VOL_P$ in which the rebuilding time was designated thereafter, and the time in which writing in the primary logical volume $VOL_P$ was made last (SP21).

The secondary channel adapter 10B that received the rebuilding order refers to the snapshot management table 26 stored in the snapshot logical volume $VOL_{SS}$, and selects the snapshot 25 that was acquired earlier than the rebuilding time yet at a time closest to the rebuilding time (SP22). Further, after acquiring the selected snapshot 25, the secondary channel adapter 10B reads the entries of all journals up to the rebuilding time from the secondary journal logical volume $VOL_{RJ}$ in order from the earliest acquisition time, and acquires the snapshot of the primary logical volume $VOL_P$ of the designated rebuilding time by sequentially applying (rebuilding) these to the snapshot 26 selected at step SP22 (SP23). Incidentally, in the following explanation, this snapshot is referred to as the rebuild logical volume $VOL_R$.

Further, the secondary channel adapter 10B determines whether the number of entries of the rebuilt journals 20 is greater than the number of blocks in the primary logical volume $VOL_P$ from the rebuilding time (SP24). And, upon obtaining a negative result (SP24; NO), the secondary channel adapter 10B uses the data of the respective entries of the respective journals 20 from the rebuilding time onward to extract the address of the respective blocks rewritten from the rebuilding time onward (SP25). Specifically, the secondary channel adapter 10B extracts the address stored in the destination address field 23 (FIG. 5) of the respective journals 20 from the rebuilding time onward.

Contrarily, upon obtaining a positive result at step SP19 (SP24; YES), the secondary channel adapter 10B uses the rebuild logical volume $VOL_R$ and extracts the address of the respective blocks rewritten from the rebuilding time onward (SP26). Specifically, the secondary channel adapter 10B extracts this address by sequentially comparing for each block the backup data of the primary logical volume $VOL_P$ stored in the secondary logical volume $VOL_S$ and the data of the rebuild logical volume $VOL_R$ so as to discover different blocks.

Figure 9:
FIG. 9 is a conceptual diagram showing the difference data.

Then, based on the extraction result, the secondary channel adapter 10B thereafter creates difference data D1 as shown in FIG. 9 which associates the address rewritten from the rebuilding time onward among the data stored in the rebuild logical volume $VOL_R$; that is, the address of the respective blocks with different data between the rebuild logical volume $VOL_R$ and the current primary logical volume $VOL_P$, and the data at the rebuilding time of such blocks; that is, the data of such block of the rebuild logical volume $VOL_R$ (SP27), and transmits this to the first DKC 4 (SP28).

The primary channel adapter 10A that received this difference data D1 rebuilds the primary logical volume $VOL_P$ of the designated rebuilding time based on this difference data D1 (SP29). Specifically, the primary channel adapter 10A overwrites data among the data stored in the respective blocks of the primary logical volume $VOL_P$ regarding the respective blocks provided with rebuilding time data as the difference data D1 on the corresponding address location of the current primary logical volume $VOL_P$. As a result, the primary logical volume $VOL_P'$ of the designated rebuilding time can be obtained.

Then, this primary channel adapter 10A sets anew the writable mode to itself and other primary channel adapters 10A allowing the writing in the rebuilt primary logical volume $VOL_P'$ (SP30). Further, the primary channel adapter 10A thereafter ends this volume rebuilding processing, and returns to the standby mode once again and waits for a host I/O from the host computer 2 (SP1).

As described above, with this storage system 1, since the rebuilding processing of the primary logical volume $VOL_P$ at a certain time is performed within the second DKC 5, the processing load of the first DKC 4, which is the main storage device in relation to the backup processing and volume rebuilding processing, can be considerably reduced.

Further, with this storage system 1, since only the difference with the current primary logical volume $VOL_P$ is transmitted from the second DKC 5 to the first DKC 4 upon reflecting the processing results of the volume rebuilding processing performed in the second DKC 5 in the primary logical volume $VOL_P$, for instance, in comparison to a case of transferring all data of the primary logical volume $VOL_P$ rebuilt in the second DKC 5 to the first DKC 4 and replacing this with the data of the current primary logical volume $VOL_P$, the processing load of the first DKC 4 can be reduced even further.

Moreover, with this storage system 1, in addition to disposing the secondary logical volume $VOL_S$ and secondary journal logical volume $VOL_{RJ}$ in the second DKC 5, since the journal 20 created in the first DKC 4 is also immediately deleted after it is completely reflected in the secondary logical volume $VOL_S$, the data retained for backup in the first DKC 4 can be kept to a minimum. Accordingly, with this storage system 1, it is possible to forestall and effectively prevent the overload of the memory capacity of the first DKC 4 caused by the retention of various backup data, and considerably reduce the capacity load of the first DKC 4 in relation to the backup processing and volume rebuilding processing.

In addition, with this storage system 1, since data with a lesser amount of operation is used among the respective journals 20 from the rebuilding time onward and the secondary logical volume $VOL_S$ retained in the second DKC 5 upon creating the difference data D1 in the second DKC 5, the processing load of the second DKC 5 in the volume rebuilding processing can also be reduced.

(2) Second Embodiment

Figure 10:
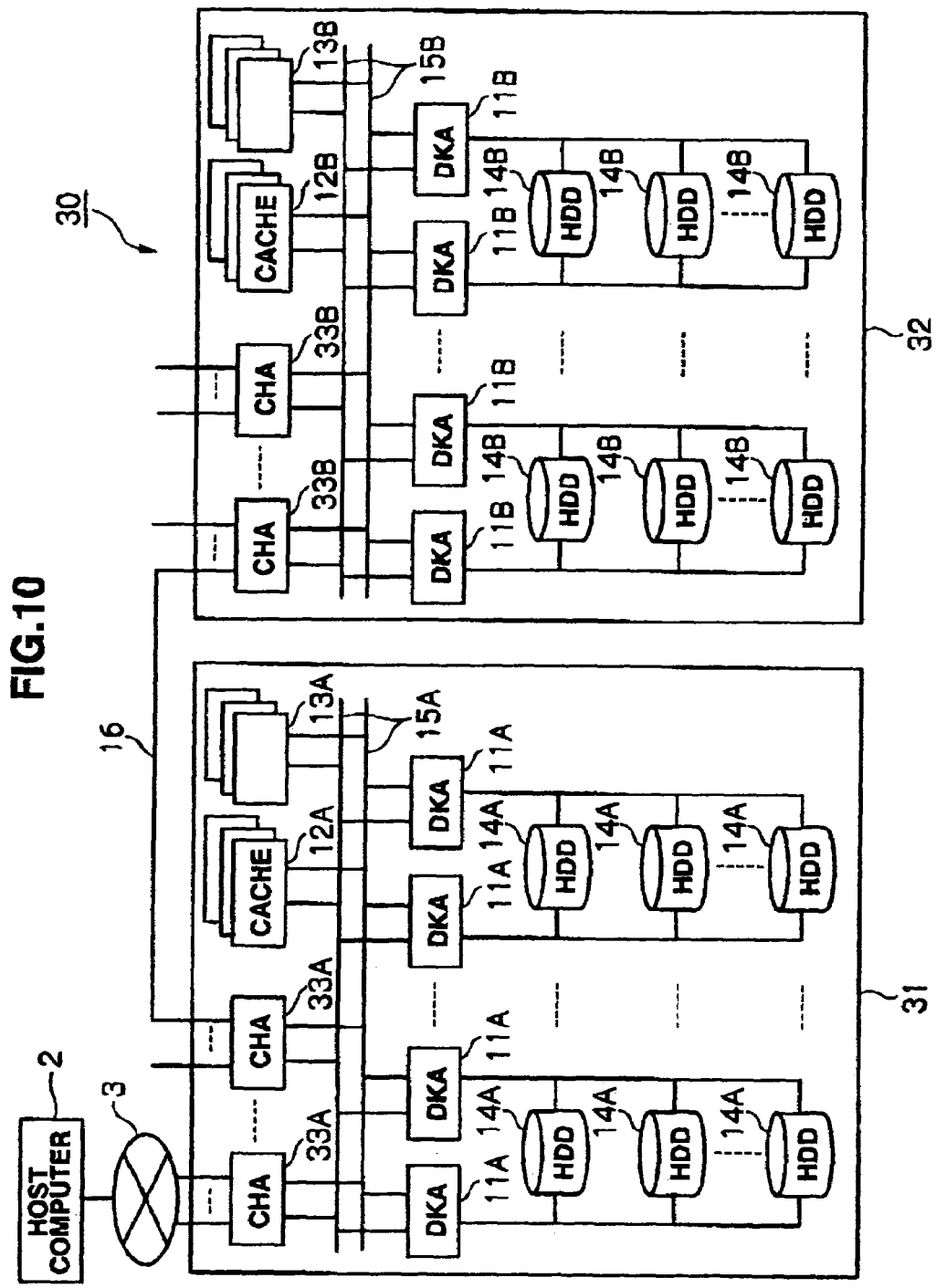
FIG. 10 is a block diagram showing the configuration of the storage system according to the second embodiment.

FIG. 10 is a diagram showing the storage system 30 according to the second embodiment, and the components corresponding to the components illustrated in FIG. 1 are given the same reference numeral. This storage system 30 is configured similar to the storage system 1 (FIG. 1) according to the first embodiment other than that the processing contents of the primary channel adapter 33A of the first DKC 31 and the secondary channel adapter 33B of the second DKC 32 relating to the backup processing and volume rebuilding processing are different.

Figure 11:
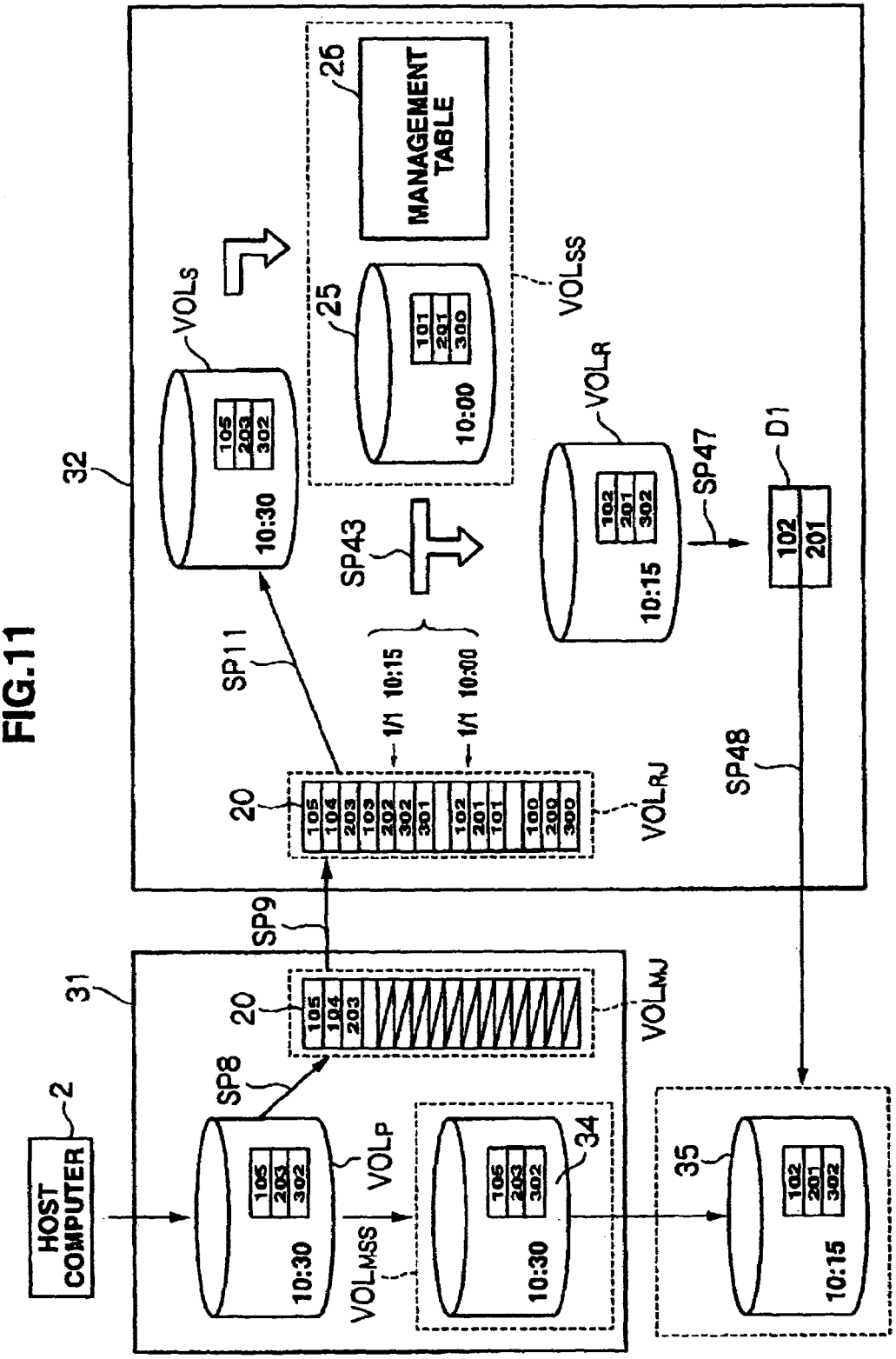
FIG. 11 is a conceptual diagram schematically showing the contents of the backup processing and volume rebuilding processing according to the second embodiment.

In actuality, with this storage system 30, as shown in FIG. 11, the first DKC 31, upon being provided with a rebuilding processing from the host computer 2, acquires a snapshot 34 of the primary logical volume $VOL_P$ at the point in time such rebuilding processing was provided, and thereafter acquires a snapshot 35 of the primary logical volume $VOL_P$ of the designated rebuilding time so as to apply the difference data D1 obtained as in the first embodiment to this snapshot 34.

Figure 12:
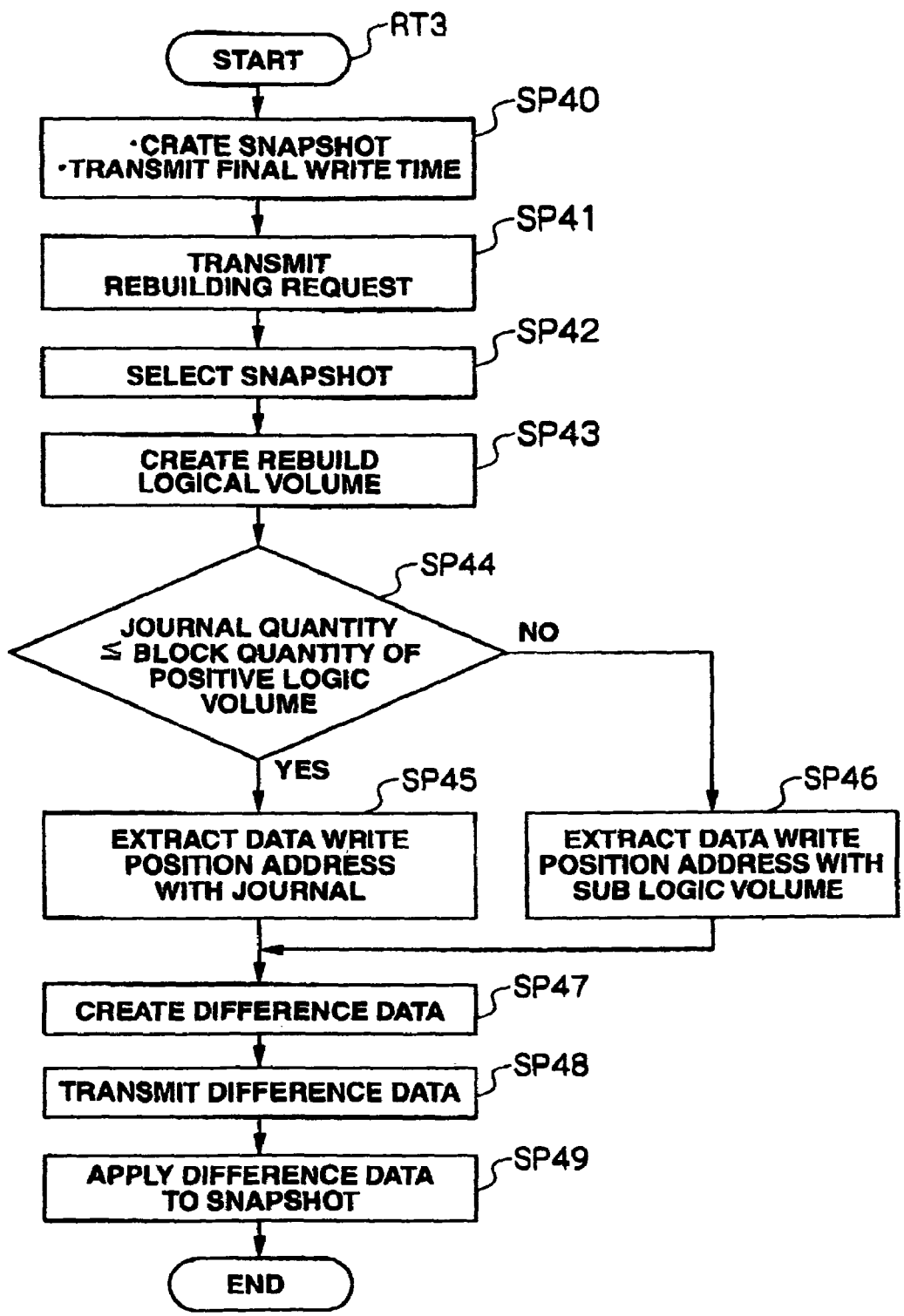
FIG. 12 is a flowchart showing the second volume rebuilding processing routine.

FIG. 12 is a flowchart showing the volume rebuilding processing routine among the specific processing steps of the first and second DCKs 31, 32 in relation to this kind of backup processing and volume rebuilding processing. The processing routine of the volume rebuilding processing in the storage system 30 are now explained with reference to FIG. 11 and FIG. 12.

Figure 3:
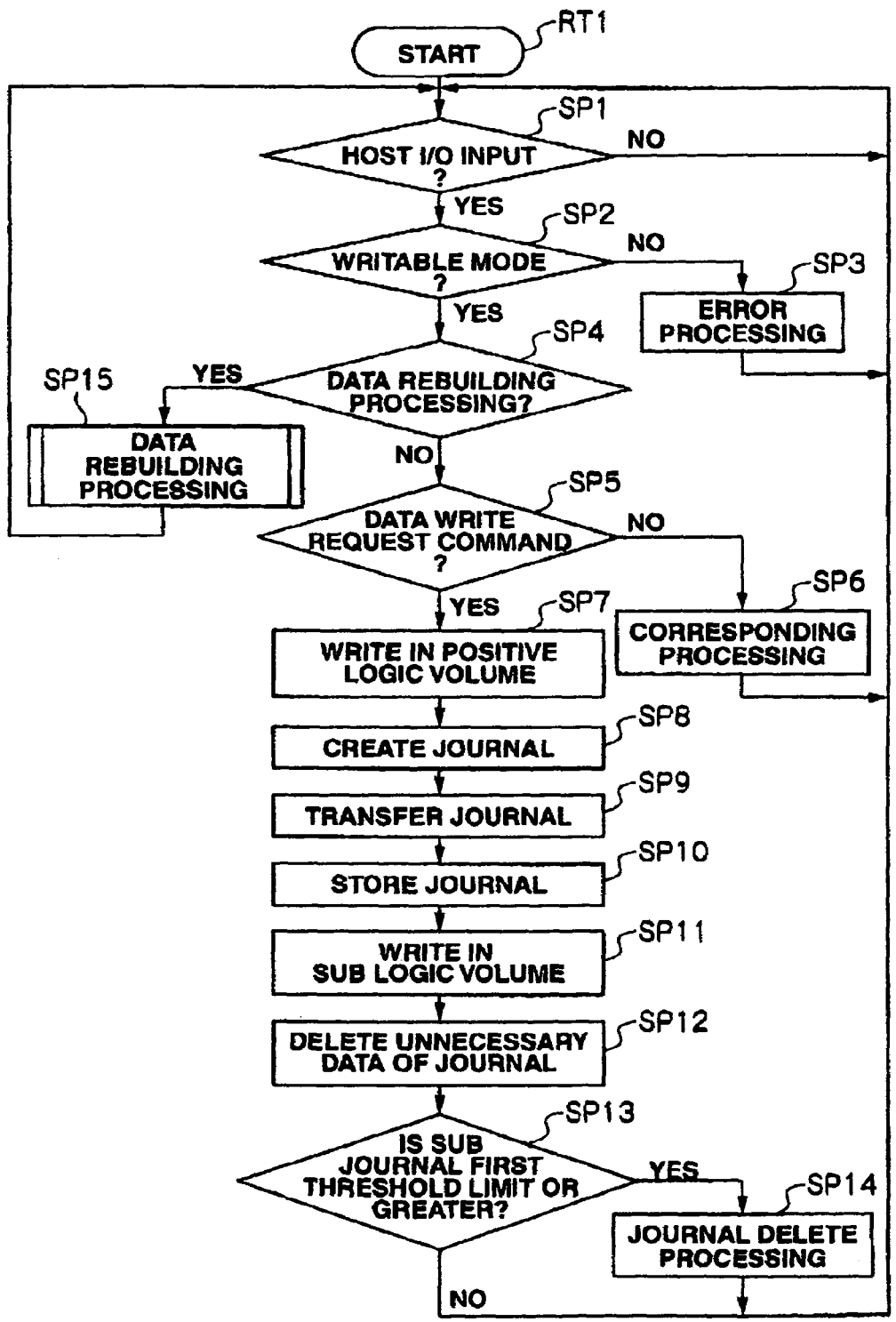
FIG. 3 is a flowchart showing the backup/volume rebuilding processing routine.

The primary channel adapter 33A, which is the channel adapter of the first DKC 31 and the secondary channel adapter 33B, which is the channel adapter of the second DKC 32, usually repeat the processing of step SP1 to step SP14 of the backup/volume rebuilding processing routine RT1 described in FIG. 3 above as with the primary channel adapters 10A (FIG. 1) and secondary channel adapters 10B (FIG. 1) of the first embodiment. Then, when a rebuilding processing is eventually provided from the host computer 2 (SP4; YES), the primary channel adapter 33A and secondary channel adapter 33B execute the volume rebuilding processing according to the second volume rebuilding processing routine RT3 shown in FIG. 12 (SP15).

In other words, the primary channel adapter 33A foremost acquires the snapshot 34 of the primary logical volume $VOL_P$ at the point in time when the rebuilding processing was provided from the host computer 2, and stores this data in the a prescribed snapshot logical volume $VOL_{MSS}$ set in advance. Further, the primary channel adapter 33A thereafter transmits to the second DKC 32 the rebuilding order designating the rebuilding time of the primary logical volume $VOL_P$ and the time in which the writing in the primary logical volume $VOL_P$ was made last (SP40).

Thereafter, the primary channel adapter 33A and secondary channel adapter 33B perform the processing of step SP41 to step SP48 of the second volume rebuilding processing routine RT3 similar to the processing of step SP21 to step SP28 of the first volume rebuilding processing routine RT2 described in FIG. 4 above. As a result, the difference data D1 described in FIG. 9 above will be created in the second DKC 32, and this is then transmitted to the first DKC 31.

The primary channel adapter 33A that received this difference data D1 applies this difference data D1 in the snapshot 34 acquired at step SP40 of the second volume rebuilding processing routine RT3 stored in the snapshot logical volume $VOL_{MSS}$ of the first DKC 31 (SP49). Specifically, the primary channel adapter 33A overwrites the respective data contained in the difference data D1 on the corresponding address of the snapshot 34. Further, when there is no data to be overwritten on the data of such snapshot 34, the primary channel adapter 33A newly registers the data contained in the difference data D1 in such snapshot 34. As a result, a snapshot 35 of the primary logical volume $VOL_P$ of the designated rebuilding time can be obtained.

Then, the primary channel adapter 33A thereafter ends the second volume rebuilding processing routine RT3, and returns to the standby mode once again and waits for a host I/O from the host computer 2 (FIG. 3; SP1).

As described above, with this storage system 30, since it acquires the snapshot 34 of the primary logical volume $VOL_P$ at the point in time the rebuilding processing was provided from the host computer 2, applies the difference data D1 to the snapshot 34, and acquires the snapshot 35 of the primary logical volume $VOL_P$ of the designated rebuilding time (rebuilds the primary logical volume $VOL_P$), there is no need to prohibit the data write request from the host computer 2 against the primary logical volume $VOL_P$ even while the volume rebuilding processing is being performed. Therefore, with this storage system 30, for instance, even when a request is made asking to confirm the contents at the time containing overwritten data, such request can be easily answered without having to prohibit the writing of data in the primary logical volume $VOL_P$.

(3) Third Embodiment

Figure 13:
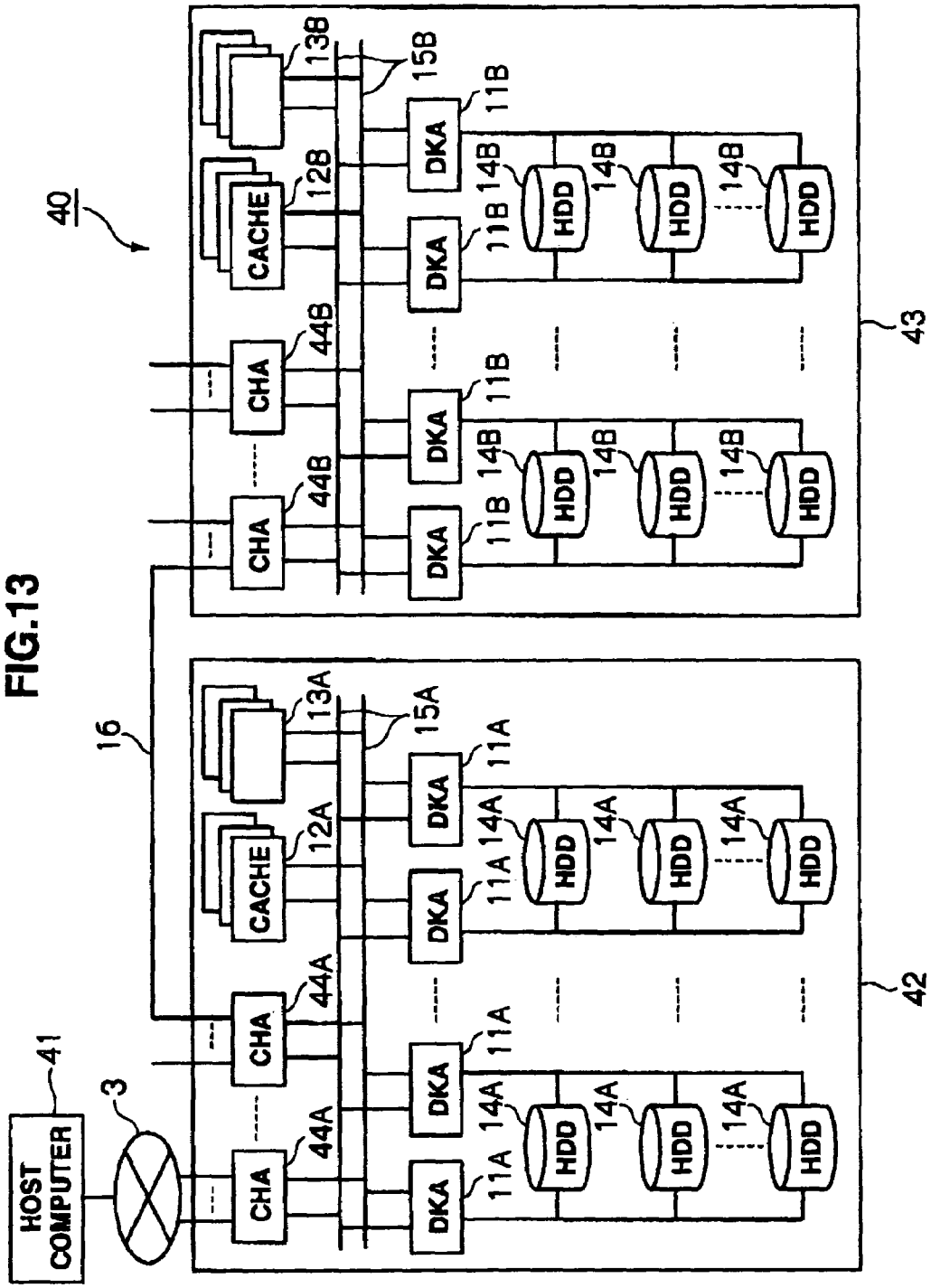
FIG. 13 is a block diagram showing the configuration of the storage system according to the third embodiment.
Figure 14:
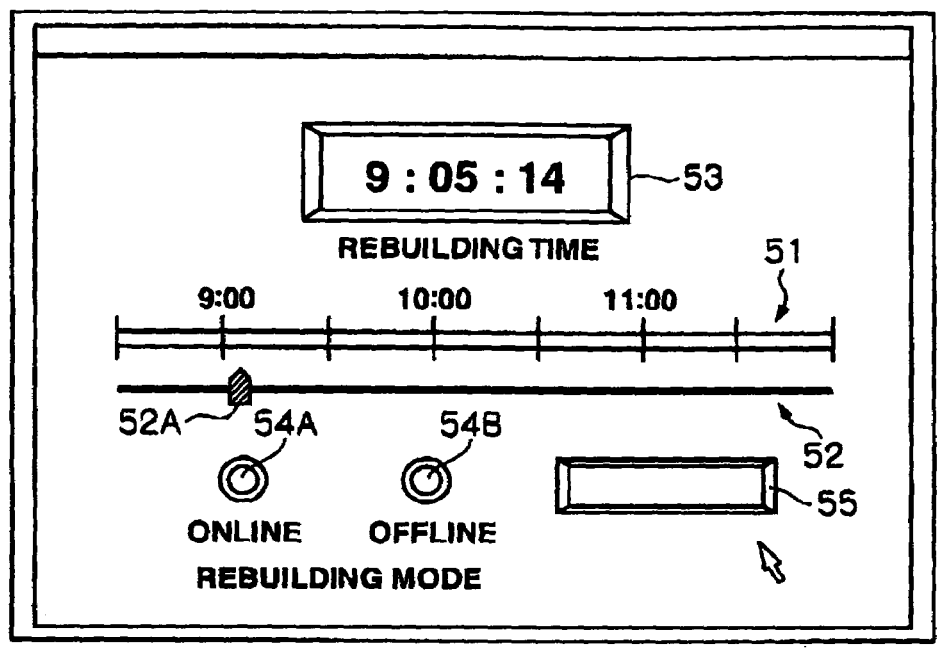
FIG. 14 is a schematic diagram showing the volume rebuilding processing mode setting screen.

FIG. 13 is a diagram showing the storage system 40 according to the third embodiment, and the components corresponding to the components illustrated in FIG. 1 are given the same reference numeral. This storage system 30 is configured similar to the storage system 1 (FIG. 1) according to the first embodiment other than that the user is able to freely select, as the volume rebuilding processing mode, either a first volume rebuilding processing mode for returning the primary logical volume $VOL_P$ itself to the state of the rebuilding time as described in the first embodiment, or a second volume rebuilding processing mode for acquiring the snapshot 35 (FIG. 11) of the primary logical volume $VOL_P$ as described in the second embodiment.

In actuality, with this storage system 40, the user is able to operate the host computer 41 and display the likes of a volume rebuilding processing mode setting screen 50 for setting and inputting the desired rebuilding time on the display of the host computer 41.

On this volume rebuilding processing mode setting screen 50, a time line 51 and cursor bar 52 are displayed at the center position thereof, and a rebuilding time display column 53 is displayed above the time line 51. And, with the time displayed on the time line 51 as the index, the user is able to designate a desired rebuilding time by using a mouse to operate a cursor 52A of a cursor bar 52 and moving it to a desired time on the time line 51. Here, displayed on the rebuilding time display column 53 is the accurate time indicated by the cursor 52A; that is, the rebuilding time designated by the user's operation.

Further, below the cursor bar 52 of the volume rebuilding processing mode setting screen 50, a first radio switch 54A associated with the foregoing first volume rebuilding processing mode and a second radio switch 54B associated with the second volume rebuilding processing mode are displayed. Accordingly, the user is able to alternatively select and set the desired data processing mode among the first and second volume rebuilding processing modes by operating the mouse and selecting either the first or second radio switch 54A, 54B. After selecting the desired volume rebuilding processing mode, the user clicks the rebuilding button 55. As a result, the rebuilding mode according to the volume rebuilding processing mode (first or second volume rebuilding processing mode) selected by the user is transmitted form the host computer 41 to the first DKC 42.

Figure 15:
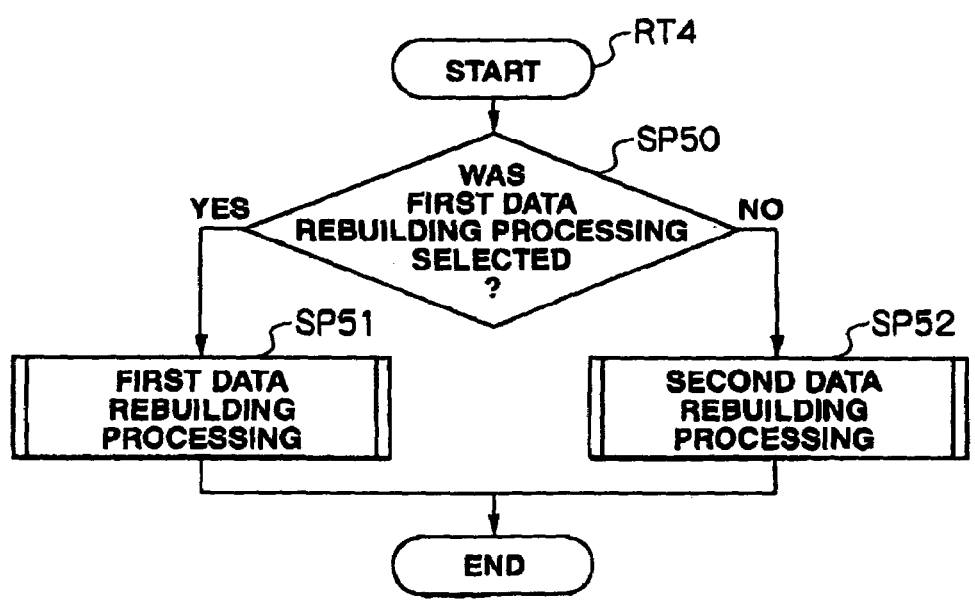
FIG. 15 is a flowchart showing the third volume rebuilding processing routine.

The primary channel adapter 44A, which is the channel adapter of the first DKC 42 and the secondary channel adapter 44B, which is the channel adapter of the second DKC 43, usually repeat the processing of step SP1 to step SP14 of the backup/volume rebuilding processing routine RT1 described in FIG. 3 above as with the primary channel adapter 10A (FIG. 1) and secondary channel adapter 10B (FIG. 1) of the first embodiment. Then, when a rebuilding processing is eventually provided from the host computer 41 (SP4; YES), the primary channel adapter 44A and secondary channel adapter 44B execute the volume rebuilding processing according to the third volume rebuilding processing routine RT3 shown in FIG. 15 (SP15).

In other words, the primary channel adapter 44A foremost determines whether the user selected the first volume rebuilding processing mode as the volume rebuilding processing mode based on the rebuilding processing (SP50). Upon obtaining a positive result in this determination (SP50; YES), the primary channel adapter 44A thereafter rebuilds the primary logical volume $VOL_P$ of the designated rebuilding time by executing the first volume rebuilding processing routine RT2 described above in FIG. 4 together with the secondary channel adapter 44B (SP51). Meanwhile, upon obtaining a negative result in this determination (SP50; NO), the primary channel adapter 44A thereafter acquires the snapshot 35 (FIG. 11) of the primary logical volume $VOL_P$ at the designated rebuilding time by executing the second volume rebuilding processing routine RT3 described above in FIG. 12 together with the secondary channel adapter 44B (SP52).

Then the primary channel adapter 44A ends the first or second volume rebuilding processing routine RT2, RT3, and returns to the standby mode once again and waits for a host I/O from the host computer 41 (FIG. 3; SP1).

As described above, with this storage system 40, the user is able to freely select, as the volume rebuilding processing mode, either a first volume rebuilding processing mode for returning the primary logical volume $VOL_P$ itself to the state of the rebuilding time as described in the first embodiment, or a second volume rebuilding processing mode for acquiring the snapshot 35 (FIG. 11) of the primary logical volume $VOL_P$ as described in the second embodiment. Therefore, proper usage will be enabled such as, when data is broken, the first volume rebuilding processing mode returning the primary logical volume $VOL_P$ to a time when the data was not broken, and, contrarily, when merely confirming the data content prior to the overwriting, the second volume rebuilding processing mode acquiring the snapshot of the primary logical volume $VOL_P$ prior to the overwriting. As a result, the usability of the storage system 40 from the user's perspective can be considerably improved.

(4) Other Embodiments

Incidentally, in the foregoing first to third embodiments, although a case was explained for creating the difference data D1 representing the difference between the primary logical volume $VOL_P$ and rebuild logical volume $VOL_R$ at the rebuilding time upon the volume rebuilding processing with the second DKCs 5, 32, 43, and transmitting this to the first DKCs 4, 31, 42, the present invention is not limited thereto and, for example, the data of the secondary logical volume $VOL_S$ created earlier than the rebuilding time yet at a time closest to the rebuilding time and the data of the respective entries of the journals 20 from the rebuilding time onward may be transmitted from the second DKCs 5, 32, 43 upon the volume rebuilding processing to the first DKCs 4, 31, 42, and the first DKCs 4, 31, 42 may perform the rebuilding processing of the primary logical volume $VOL_P$ based on such data.

Further, in the foregoing first to third embodiments, although a case was explained where, as a result of providing the time in which corresponding data was written as data of the journal 20, the order of the respective entries is secured based on this time, the present invention is not limited thereto, and a sequence number may be granted to the respective entries in addition to or in place of such time, and the order of the respective entries may be secured based on such sequence number. Incidentally, in this case, a separate management table associating the respective sequence numbers and the times in which the corresponding data were written will be necessary.

Similarly, the order of the snapshot 25 of the secondary logical volume $VOL_S$ acquired in prescribed time intervals in the second DKCs 5, 32, 43 may also be managed with a sequence number instead of the time in which such snapshot 25 was acquired. Here, the association of the respective sequence numbers and the time such snapshots were acquired may be conducted, for instance, in the snapshot management table 26.

The present invention may be widely applied to a variety of storage systems.

We claim:

1. A storage system having a first storage device connected to a host system and which provides a first volume for storing data transmitted from said host system, and a second storage device connected to said first storage device and which provides a second volume for storing backup data of said first volume;

wherein said first storage device comprises a journal creation unit for creating a journal representing the written contents when said data is written in said first volume;

said second storage device comprises:

a snapshot acquisition unit for acquiring a snapshot of said second volume in a prescribed timing;

a memory device for storing each of said journals transmitted from said first storage device and said snapshot acquired with said snapshot acquisition unit;

a volume rebuilding unit for rebuilding, upon using the corresponding said journal and said snapshot stored in said memory device in accordance with the rebuilding order designating the rebuilding time provided from said host system, said first volume at said rebuilding time; and a difference data output unit for outputting said data of an address rewritten from said rebuilding time onward among said rebuilt data stored in said first volume at said rebuilding time as difference data; and said first storage device rebuilds said first volume at said rebuilding time based on said difference data transmitted from said second storage device.

2. The storage system according to claim 1, wherein said first storage device prohibits the writing in said first volume when said rebuilding order is provided from said host system, and rebuilds said first volume at said rebuilding time so as to apply said difference data transmitted from said second storage device to said first volume.

3. The storage system according to claim 1, wherein said first storage device acquires a snapshot of said first volume when said rebuilding order is provided from said host system, and rebuilds said first volume at said rebuilding time so as to apply said difference data transmitted from said second storage device to the snapshot of said first volume.

4. The storage system according to claim 1, wherein said host system displays a prescribed setting screen for alternatively selecting and setting either a first or second rebuilding processing mode as a rebuilding processing mode for rebuilding said first volume, and transmits said rebuilding order to said first storage device according to said rebuilding processing mode set with said setting screen; and when said first rebuilding processing mode is set based on said rebuilding order, said first storage device prohibits the writing in said first volume when said rebuilding order is provided from said host system and rebuilds said first volume at said rebuilding time so as to apply said difference data transmitted from said second storage device to said first volume, and, when said second rebuilding processing mode is set based on said rebuilding order, said first storage device acquires a snapshot of said first volume when said rebuilding order is provided from said host system and rebuilds said first volume at said rebuilding time so as to apply said difference data transmitted from said second storage device to the snapshot of said first volume.

5. The storage system according to claim 1, wherein said difference data output unit of said second storage device detects an address rewritten from said rebuilding time onward upon using each of said journals during the period until said rebuilding order is provided from said rebuilding time, or said second volume, whichever will result in a lesser amount of operation.

6. The storage system according to claim 1, wherein the snapshot acquisition unit of said second storage device acquires a snapshot of second volume in a prescribed time interval.

7. A data management method in a storage system having a first storage device connected to a host system and which provides a first volume for storing data transmitted from said host system, and a second storage device connected to said first storage device and which provides a second volume for storing backup data of said first volume, comprising:

a first step of creating, on said first storage device side, a journal representing the written contents when said data is written in said first volume and transmitting this to said second storage device, and, on said second storage device side, acquiring a snapshot of said second volume in a prescribed timing and storing said snapshot and each of said journals transmitted from said first storage device;

a second step of rebuilding, on said second storage device side, upon using the corresponding said journal and said snapshot stored in said memory device in accordance with the rebuilding order designating the rebuilding time provided from said host system, said first volume at said rebuilding time;

a third step of transmitting, on said second storage device side, said data of an address rewritten from said rebuilding time onward among said rebuilt data stored in said first volume at said rebuilding time as difference data to said first storage device; and a fourth step of rebuilding, on said first storage device side, said first volume at said rebuilding time based on said difference data.

8. The data management method according to claim 7, wherein said first storage device, at said second step, prohibits the writing in said first volume when said rebuilding order is provided from said host system, and, at said fourth step, rebuilds said first volume at said rebuilding time so as to apply said difference data transmitted from said second storage device to said first volume.

9. The data management method according to claim 7, wherein said first storage device, at said second step, acquires a snapshot of said first volume when said rebuilding order is provided from said host system, and, at said fourth step, rebuilds said first volume at said rebuilding time so as to apply said difference data transmitted from said second storage device to the snapshot of said first volume.

10. The data management method according to claim 7, wherein said host system displays a prescribed setting screen for alternatively selecting and setting either a first or second rebuilding processing mode as a rebuilding processing mode for rebuilding said first volume, and transmits said rebuilding order to said first storage device according to said rebuilding processing mode set with said setting screen; and at said second step, when said first rebuilding processing mode is set based on said rebuilding order, said first storage device prohibits the writing in said first volume when said rebuilding order is provided from said host system and, at said fourth step, rebuilds said first volume at said rebuilding time so as to apply said difference data transmitted from said second storage device to said first volume, and when said second rebuilding processing mode is set based on said rebuilding order, at said second step, acquires a snapshot of said first volume when said rebuilding order is provided from said host system and, at said fourth step, rebuilds said first volume at said rebuilding time so as to apply said difference data transmitted from said second storage device to the snapshot of said first volume.

11. The data management method according to claim 7, wherein said second storage device, at said third step, detects an address rewritten from said rebuilding time onward upon using each of said journals during the period until said rebuilding order is provided from said rebuilding time, or said second volume, whichever will result in a lesser amount of operation.

12. The data management method according to claim 7, wherein said second storage device, at said first step, acquires a snapshot of said second volume in a prescribed time interval.

13. A storage system having a first storage device connected to a host system and comprising a first volume for storing data transmitted from said host system, and a second storage device connected to said first storage device and comprising a second volume for storing backup data of said first volume;

wherein said first storage device comprises a journal representing the written contents when said data is written in said first volume, and a transmission unit for transmitting said journal to said second storage device;

said second storage device comprises:

a snapshot acquisition unit for acquiring a snapshot of said second volume in a prescribed timing;

a memory device for storing said journal transmitted from said first storage device and said snapshot acquired with said snapshot acquisition unit;

a rebuilding unit for rebuilding, upon using said snapshot stored in said memory device in accordance with the rebuilding order designating the rebuilding time provided from said host system and said journal stored in said memory and associated with said rebuilding order in accordance with said rebuilding order, the data content stored in said first volume at said rebuilding time; and a difference data output unit for transmitting said data corresponding to an address written from said host system after said rebuilding time among said data content as difference data to said first storage device; and said first storage device rebuilds the data content stored in said first volume at said rebuilding time based on said difference data transmitted from said second storage device, and said first volume.

* * * * *